United States Patent
Into

(10) Patent No.: US 6,545,726 B2
(45) Date of Patent: Apr. 8, 2003

(54) COLOR CONVERSION APPARATUS FOR IMAGE DATA AND COLOR CONVERSION METHOD FOR IMAGE DATA

(75) Inventor: Shozo Into, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/073,457

(22) Filed: Feb. 11, 2002

(65) Prior Publication Data

US 2002/0101542 A1 Aug. 1, 2002

Related U.S. Application Data

(63) Continuation of application No. 08/714,155, filed on Sep. 18, 1996.

(30) Foreign Application Priority Data

Jan. 18, 1995 (JP) ............................................. 7-005906

(51) Int. Cl.[7] .................................................. H04N 9/64
(52) U.S. Cl. ....................................................... 348/649
(58) Field of Search ................................. 348/659, 590, 348/591, 578, 645–649, 708, 650, 654; 382/167; 358/518, 520

(56) References Cited

U.S. PATENT DOCUMENTS

| | | | | |
|---|---|---|---|---|
| 4,811,084 A | * | 3/1989 | Bemares-Sarabia et al. | .. 358/22 |
| 5,058,040 A | | 10/1991 | Tajima | |
| 5,212,544 A | | 5/1993 | Kellar et al. | |
| 5,282,021 A | * | 1/1994 | Bachmann et al. | ........... 358/58 |
| 5,311,334 A | | 5/1994 | Sugiura | |
| 5,355,225 A | * | 10/1994 | Bachmann et al. | ......... 348/645 |
| 5,400,081 A | * | 3/1995 | Chaplin et al. | ............. 348/587 |
| 5,428,465 A | | 6/1995 | Kanamori et al. | |
| 5,436,673 A | * | 7/1995 | Bachmann et al. | ......... 348/645 |
| 5,793,445 A | * | 8/1998 | Lum et al. | .................. 348/720 |
| 5,867,285 A | | 2/1999 | Hirota et al. | |
| 6,075,887 A | * | 8/2000 | Brett | .......................... 382/167 |

FOREIGN PATENT DOCUMENTS

| | | |
|---|---|---|
| JP | 63-244094 | 10/1988 |
| JP | 6-121332 | 4/1994 |

* cited by examiner

*Primary Examiner*—John Miller
*Assistant Examiner*—Paulos M Natnael
(74) *Attorney, Agent, or Firm*—Frommer Lawrence & Haug LLP; William S. Frommer; Dennis M. Smid

(57) ABSTRACT

It is an object of the present invention to provide a color conversion apparatus in which an output result of a color converting circuit at the succeeding stage for color-converting a specific color can be prevented from being affected by an output result of a color converting circuit at the preceding stage for color-converting a whole image. Since a first color converting circuit (10) color-converts a whole image of image data in a first color-conversion fashion. A second color converting circuit (20) color-converts only the area of such color in a second color-conversion fashion by adding a correction signal which results from multiplying a key signal (4) indicative of an area of specific color to image data in which the whole image is color-converted in a first color-conversion fashion and a key signal generating circuit (30) generates the key signal (4) from the image data supplied to the first color converting circuit 10 the output result of the second color converting circuit (20) at the succeeding stage for color-converting the specific color can be prevented from being affected by the output result from the first color converting circuit (10) at the succeeding stage for color-converting the whole image.

1 Claim, 7 Drawing Sheets

COLOR CONVERSION APPARATUS FOR IMAGE DATA AND COLOR CONVERSION METHOD FOR IMAGE DATA

This application is a continuation of application Ser. No. 08/714,155, filed Sep. 18, 1996.

TECHNICAL FIELD

The present invention relates to a color conversion apparatus for image data and a color conversion method for image data used to color-convert an image when video signals are synthesized by a switcher.

BACKGROUND ART

In the process for editing a video signal, a video signal supplied from a camera or the like is supplied to a color conversion circuit. The color conversion circuit color-converts video signals.

Video signals color-converted by the color conversion circuit are supplied to a switcher. A video output signal synthesized by the switcher is supplied to a recording VTR and thereby recorded on a video tape, thus to obtain a video tape on which a color-converted video signal is recorded.

The switcher synthesizes the color-converted video signal with a video signal by a proper method such as wipe or mix. The wipe is to insert other image into a certain image while wiping a certain image with a specific pattern or excluding a certain image from the picture screen. The mix is to fade-in other image while fading-out a certain image. The video signal synthesized by the switcher is supplied to a recording VTR not shown.

The aforementioned color conversion circuit is roughly classified as two color conversion circuits. One color conversion circuit is a first color conversion circuit for color-converting the whole areas of an inputted video signal in the same manner. This color conversion applies to the case that an inputted video signal is corrected so as to become reddish on the whole. The other color conversion circuit is a second color conversion circuit for designating a specific color in an inputted video signal and color-converting such specific color. This color conversion applies to the case that a color of a reddish (specific color) area in the inputted video signal is corrected so as to become a red color with high saturation.

In order to implement such two color conversions, it is proposed to connect the second color conversion circuit to the rear stage of the first color conversion circuit. In this case, an output signal color-converted by the first color conversion circuit is a signal which results from color-converting the inputted video signal. However, since the output signal from the first color conversion circuit is already color-converted, when a specific color is designated by the second color conversion circuit, such specific color cannot be designated precisely. In other words, the second color conversion circuit cannot designate a specific color precisely due to an influence of an outputted result of the first color conversion circuit.

This will hereinafter be described with reference to the aforesaid example. The output signal from the first color conversion circuit is a signal which is reddish on the whole relative to the inputted video signal. If the second conversion circuit with the reddish signal inserted thereto designated a reddish color which becomes a specific color, an area that should not be designated would be designated.

In order to further facilitate the understanding, the following special example will be considered. The first color conversion circuit, for example, color-converts an inputted video signal such that a color component is eliminated from the inputted video signal and the inputted video signal becomes a black and white video signal. Then, the video signal inputted to the second color conversion circuit of the succeeding stage does not contain a color component so that the second color conversion circuit cannot designate a specific color. That is, the second color conversion circuit cannot perform a color conversion.

As described above, when the apparatus includes the first color conversion circuit for color-converting the whole of the inputted video signal and the second color conversion circuit for color-converting the inputted video signal to a specific color, if the second color conversion circuit is connected to the rear stage of the first color conversion circuit, then the succeeding second color conversion circuit cannot perform the accurate color conversion.

It is an object of the present invention to provide a color conversion apparatus in which the succeeding second color conversion circuit can accurately color-convert image data outputted from the preceding first color conversion circuit without being affected by the color-conversion of the first color conversion circuit.

DISCLOSURE OF INVENTION

A color conversion apparatus for image data according to the first invention is a color conversion apparatus for image data for color-correcting or color-converting image data, and includes a first color-converting means for effecting a first color-conversion on inputted image data, a second color-converting means for effecting a second color-conversion by adding a correction signal, which is corrected so as to cancel the first color-conversion carried out by the first color converting means out, to a specific area of image data outputted from the first color converting means and a key signal generating means for generating a key signal from the image data supplied to the first color converting means, According to the first invention, the first color-conversion is effected on the image data by the first color-converting means, the second color-converting means effects the second color conversion by adding the correction signal, which is corrected so as to cancel the first color conversion carried out by the first color-converting means out, to the specific area of the image data outputted from the first color-converting means and the key signal generating means generates the key signal from the image data supplied to the first color-converting means, the outputted result of the succeeding color converting means for color-converting the specific color can be prevented from being affected by the outputted result of the preceding color-converting means for color-converting the whole of the image.

In a color conversion apparatus for image data according to the second invention, the second color-converting means uses the correction signal which is corrected so as to cancel the first color-conversion for image data carried out by the first color-converting means, whereby color conversion can be prevented from being affected by color conversion of image data carried out by the first color-converting means.

According to the second invention, since the second color-converting means uses the correction signal which is corrected so as to cancel the first color conversion for image data carried out by the first color-converting means out, color conversion can be prevented from being affected by the color conversion for image data carried out by the first color converting means. Therefore, the whole of image can be color-converted and the specific color can be color-converted at the same time, and can be prevented from affecting each other.

In a color conversion apparatus for image data according to the third invention, a key signal generating means includes a color coordinate rotation means for designating a color coordinate direction in which a key signal is generated.

According to the third invention, since the key signal generating means includes the color coordinate rotation means for designating the color coordinate direction in which the key signal is generated, a coordinate axis expressing a color space can be rotated in accordance with a color direction in which the key signal is generated.

A color conversion method of image data according to the fourth invention is a color conversion method of image data for color-correcting or color-converting image data, and comprises the steps of effecting a first color-conversion on inputted image data, generating a key signal from image data outputted by the first color-conversion, and effecting a second color-conversion by adding a correction signal, which is corrected so as to cancel the first color-conversion carried out by the first color-converting means out, to a specific area of image data color-converted by the first color-conversion, thereby color-converting only the area of specific color.

According to the present invention, a result which is obtained by color-converting a specific color at the succeeding stage can be prevented from being affected by a result which is obtained by color-converting the whole image at the preceding stage.

In a color conversion method of image data according to the fifth invention, the key signal is multiplied with image data indicative of a color area which results from subtracting conversion image data from image data of specific color.

According to the fifth invention, the image data indicative of the color area in which the conversion image data is subtracted from the image data of specific color is generated, whereby the correction signal can be easily generated.

In a color conversion method of image data according to the sixth invention, the first color-conversion data for color-converting the whole image of image data and image data of specific color are entered by an input means.

According to the sixth invention, image data that is used to generate the correction signal can easily be generated y entering image data of specific color.

A color conversion apparatus of image data according to the seventh invention is a color conversion apparatus of image data for color-converting inputted image data, and includes a parameter input means for inputting a first color-conversion parameter, a second color-conversion parameter and a color-designating parameter, a first color-converting means for effecting a first color-conversion on the inputted image data, a key signal generating means for generating a key signal indicative of an area having a color designated by the color-designating parameter of the inputted image data, a second color-converting means for effecting a second color-conversion on outputted image data outputted from the first color-converting means at its area indicated by the key signal, and a control means for supplying a first control signal to the first color-converting means such that the first color-conversion becomes a color-conversion corresponding to the first color-conversion parameter and supplying a second control signal to the second color conversion circuit such that the second color-conversion becomes a color-conversion in which the first color-conversion is canceled from the color-conversion corresponding to the second color-conversion parameter.

Furthermore, according to the seventh invention, since the first color-conversion parameter, the second color-conversion parameter and the color-designating parameter are entered to control the color-conversion, a result which is obtained by the succeeding color-conversion of a specific color can be prevented from being affected by a result which is obtained by the preceding color-conversion of the whole of the image by designating a desired color. This is also true in the eighth invention to the twelfth invention.

BEST MODE FOR CARRYING OUT THE INVENTION

In a color conversion apparatus for image data according to the present invention, particularly in this embodiment, a first color-conversion parameter, a second color-conversion parameter and a color-designating parameter are entered respectively, a first color-conversion is effected on inputted image data, a key signal indicative of an area having a color designated by the color-designating parameter of inputted image data is generated, a second color-conversion is effected on an area indicated by the key signal of output image data processed by the first color-conversion, the first color-conversion is controlled such that the first color-conversion becomes a color-conversion corresponding to the first color-conversion parameter and the second color-conversion is controlled such that the second color-conversion becomes a color-conversion in which the first color-conversion is canceled from a color-conversion corresponding to the second color-conversion parameter, whereby an output result of the succeeding second color conversion circuit for color-converting a specific color can be prevented from being affected by an output result of the preceding first color conversion circuit for color-converting the whole of the image.

Figure 1:
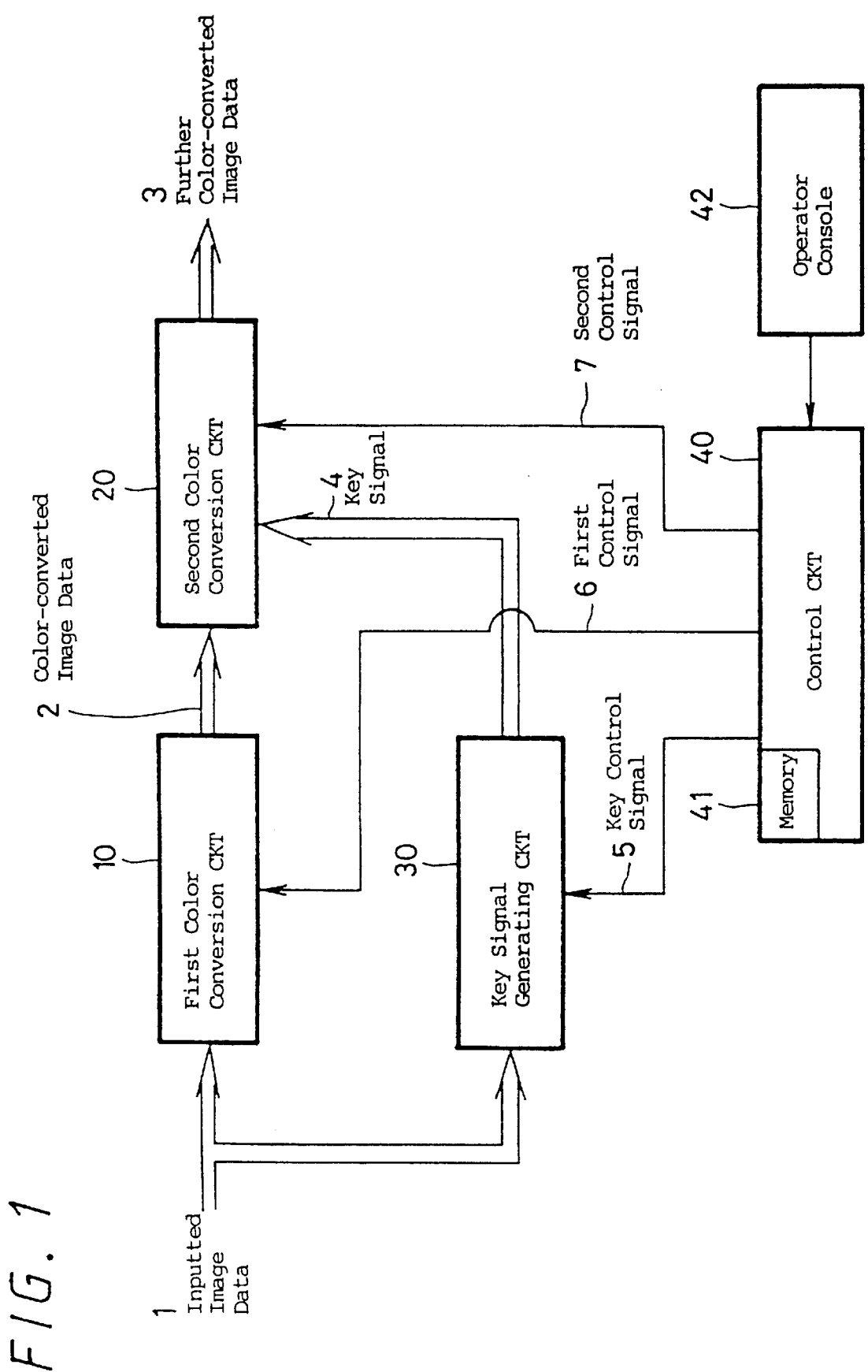
FIG. 1 is a block diagram showing an arrangement of a color conversion apparatus for image data according to an embodiment of the present invention.

FIG. 1 is a block diagram showing an arrangement of a color conversion apparatus for image data according to an embodiment of the present invention. Initially, an arrangement of color conversion apparatus for image data will be described. The color conversion apparatus for image data includes a first color conversion circuit 10 for color-converting the whole of inputted image data and a second color conversion circuit 20 for color-converting image data outputted from the first color conversion circuit 10 only at its area of a specific color. Also, the color conversion apparatus for image data includes a key signal generating circuit 30 for generating a key signal based on inputted image data, a control circuit 40 for supplying control signals to the first color conversion circuit 10, the second color conversion circuit 20 and the key signal generating circuit 30 and an operator console 42 for entering a first color-converting parameter indicative of the color conversion done by the first color conversion circuit 10, a second color-converting parameter indicative of the color conversion effected on only the specific area by the second color conversion circuit 20 and a color-designating parameter for designating a specific color designated by the key signal generating circuit 30. The control circuit 40 includes a memory 41 for storing therein the inputted image data 1 and the first color-converting parameter.

The first color conversion circuit 10 constructs a first color-converting means, the second color conversion circuit 20 constructs a second color-converting means, the key signal generating circuit 30 constructs a key signal generating means, the control circuit 40 constructs a control means, the memory 41 constructs a memory means, and the operator console 42 constructs an input means, respectively.

An operation of the thus arranged color conversion apparatus for image data will be described. The inputted image data 1 is initially supplied to the first color conversion circuit 10. An operator enters the first color-conversion parameter into the first color conversion circuit 10 by operating the operator console 42. The first color-converting parameter is supplied to the control circuit 40. The control circuit 40 supplies a control signal 6 based on the first color-converting parameter to the first color conversion circuit 10. The first color conversion circuit 10 color-converts the inputted image data 1 based on the control signal 6. Image data 2 which is wholly color-converted by the first color conversion circuit 10 is supplied to the second color conversion circuit 20. The image data that has been wholly color-converted by the first color conversion circuit 10 is supplied to the second color conversion circuit 20. In order to indicate the color conversion done by the first color conversion circuit 10, the inputted image data and the first color-conversion-parameter are supplied to the memory 41.

Then, the operator enters the second color-conversion parameter and the color-designating parameter by operating the operator console 42. The operator enters the second color-converting parameter as a color-converting parameter necessary for obtaining further color-converted image data 3 from the inputted image data. That is, the second color-conversion parameter is a color-conversion parameter indicating a color-conversion for obtaining the further color-converted image 3 from the inputted image data 1. The second color-conversion parameter is not a color-conversion parameter indicating the second color-conversion done by the second color conversion circuit 20, i.e., not a color-conversion parameter indicating the color conversion for obtaining the further color-converted image data 3 from the color-converted image data 2. The operator enters the color-designating parameter for indicating a specific color for determining the key signal generated by the key signal generating circuit 30.

The control circuit 40 generates a key control signal 5 for indicating a specific color based on the color-designating parameter entered from the operator console 42. The control circuit 40 supplies the key control signal to the key signal generating circuit 30.

The inputted image data is supplied to the first color conversion circuit 10 and the key signal generating circuit 30. The key signal generating circuit 30 generates a key signal 4 based on the key control signal supplied thereto from the control circuit 40. This key signal 4 is a signal indicative of the area having the specific color designated by the key control signal. The thus generated key signal 4 is supplied to the second color conversion circuit 20.

The control-circuit 40 generates a second control signal 7 based on the inputted image data stored in the memory, the first color-conversion parameter and the second color-conversion parameter entered by the operator console 42. It is to be noted that the second control signal 7 is not the control signal indicative of the color-conversion corresponding to the second color-conversion parameter. The second control signal 7 is the control signal indicative of the color-conversion in which the first color-conversion is canceled from the color conversion corresponding to the second color-conversion parameter.

The color-converted image data 2 outputted from the first color conversion circuit 10 and the key signal 4 outputted from the key signal generating circuit 30 are supplied to the first color conversion circuit 20. The second control signal 7 is supplied to the second color conversion circuit from the control circuit 40. The second color conversion circuit 20 generates a correction signal which results from multiplying the area designated by the key signal 4 with color-conversion data ($Y_0$, $U_0$, $V_0$) designated by the second control signal. That is, this correction signal is planar data having the color-conversion data ($Y_0$, $U_0$, $V_0$) designated by the second control signal only in the area designated by the key signal. Then, this correction signal is added to the color-converted image data 2 supplied from the first color conversion circuit 10.

Thus, the second color-conversion can be effected on only the area shown by the key signal 4. This second color-conversion is a color-conversion in which the first color-conversion is canceled from a color-conversion corresponding to the second color-conversion parameter. Accordingly, a color conversion that is designated by the second color-conversion parameter can be effected without being affected by the first color conversion circuit 10.

Figure 2:
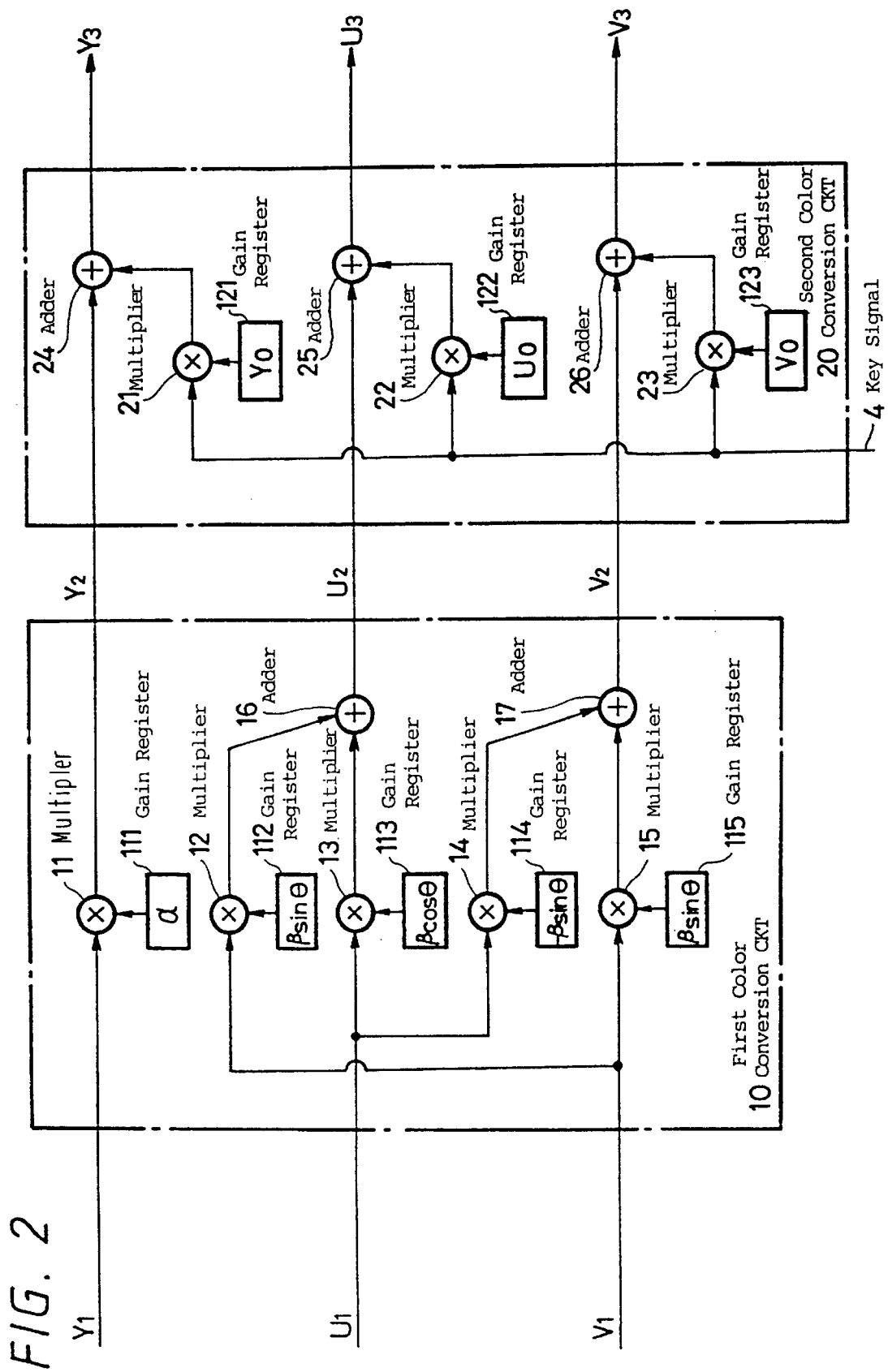
FIG. 2 is a circuit diagram showing in detail arrangements of a color conversion circuit 10 and a color conversion circuit 20 of the color conversion apparatus for image data according to the embodiment of the present invention.

FIG. 2 is a circuit diagram showing in detail arrangements of the first color conversion circuit 10 and the second color conversion circuit 20 in the color conversion apparatus for image data according to the embodiment of the present invention. In FIG. 2, the control circuit 40 shown in FIG. 1 is omitted. The arrangements of the first color conversion circuit 10 and the second color conversion circuit 20 will be described first. The first color conversion circuit 10 includes a gain register 111 having a gain coefficient α, a gain register 112 having a gain which results from multiplying a gain coefficient β and color-conversion data sinθ, a gain register 113 having a gain which results from multiplying a gain β and color conversion data cosθ, a gain register 114 having a gain which results from multiplying a gain β and color-conversion data sinθ and a gain register 115 having a gain which results from multiplying a gain β and color-conversion data sinθ.

Further, the first color conversion circuit 10 includes a multiplier 11 for multiplying image data of component signal $Y_1$ and the gain of the gain register 111, a multiplier 112 for multiplying image data of component signal $V_1$ and the gain of the gain register 112, a multiplier 113 for multiplying image data of component signal $U_1$ and the gain of the gain register 114, a multiplier 15 for multiplying image data of component signally and the gain of the gain register 115, an adder 16 for adding an output from the multiplier 12 and an output from the multiplier 13 and an adder 17 for adding an output from the multiplier 14 and an output from the multiplier 15. Gain data of the gain register 111, the gain register 112, the gain register 113, the gain register 114 and the gain register 115 are respectively computed by the control circuit 40 based on the first color-conversion parameter entered from the operator console 42. Respective gain data are supplied from the control circuit 40.

The second color conversion circuit 20 includes a gain register 121 to which color-conversion data shown by $Y_0$ is supplied, a gain register 122 to which color-conversion data shown by $U_0$ is supplied and a gain register 123 to which color-conversion data shown by $V_0$ is supplied. The color conversion data ($Y_0$, $U_0$, $V_0$) supplied to the gain register 121, the gain register 122 and the gain register 123 is data indicative of color-conversion done by the second control signal 7 generated based on the inputted image data and the first color-conversion parameter stored in the memory 41 and the second color-conversion parameter entered by the operator console 42.

The second color conversion circuit 20 includes a multiplier 21 for multiplying the key signal 4 and the gain $Y_0$ of the gain register 121, a multiplier 22 for multiplying the key signal 4 and the gain $U_0$ of the gain register 122 and a multiplier 23 for multiplying the key signal 4 and the gain $V_0$ of the gain register 123. Further, the second color conversion circuit 20 includes an adder 24 for adding a component signal $Y_2$ outputted from the first color conversion circuit 10 and an output from the multiplier 21, an adder 25 for adding a component signal $U_2$ and an output from the multiplier 21 and an adder 26 for adding a component signal $V_2$ and an output from the multiplier 23.

Operations of the first color conversion circuit 10 and the second color conversion circuit 20 will be described next. In FIG. 2, the component signals $Y_1$, $U_1$, $V_1$ as image data are supplied to the multipliers 11, 13, 15 of the first color conversion circuit 10. The component signals $Y_1$, $U_1$, $V_1$ are signals expressed by Y, R-Y and B-Y, and these signals may be signals R, G, B.

The gain register 111 supplies the gain α of the component signal $Y_1$ to the multiplier 11. The gain register 113 supplies the gain βcosθ of the component signal $U_1$ to the multiplier 13. The gain register 115 supplies the gain βsinθ of the component signal $V_1$ to the multiplier 15.

The component signal $V_1$ is supplied to the multiplier 12. The gain register 112 supplies the gain βsinθ of the component signals $U_1$ and $V_1$ to the multiplier 12. Outputs from the multipliers 12 and 13 are supplied to and added by the adder 16. The component signal $U_1$ is supplied to the multiplier 14. The gain register 114 supplies the gain βsinθ of the component signals $V_1$ and $U_1$ to the multiplier 14. Outputs from the multipliers 14 and 15 are supplied to and added by the adder 17.

Assuming a color conversion matrix A as:

$$A = \begin{bmatrix} \cos\theta & \sin\theta \\ -\sin\theta & \cos\theta \end{bmatrix}$$

then a color conversion indicated by the first color conversion circuit 10 can be expressed by the following equations:

$$Y_2 = \alpha Y_2 \tag{1}$$

$$\begin{bmatrix} U_2 \\ V_2 \end{bmatrix} = \beta A \begin{bmatrix} U_1 \\ V_1 \end{bmatrix} \tag{2}$$

The equation (1) is a variable concerning a luminance component and means that a gain of a luminance component (Y) of the component signal is varied by multiplication of the coefficient α. The equation (2) means that hue is varied by rotating a color component (chroma) of the component signal when a color point in a three-dimensional color coordinate composed of axes of lightness, saturation and hue is rotated by θ on a hue plane and that saturation is varied by changing a gain of the color component by a multiplication of β.

The color conversion matrix A used for the color conversion by the first color conversion circuit 10 is computed by the control circuit 40 based on the first color-conversion parameter designated relative to the first color conversion circuit 10 when the operator operates the operator console 42 shown in FIG. 1.

Specifically, the gain of the luminance component $Y_1$ is changed by the multiplier 11 and the gain register 111. Also, the gain of the color component can be adjusted by effecting the above-mentioned 2×2 matrix computation on the color components $U_1$ and $V_1$ by the multipliers 12, 13, 14, 15 and the adders 16, 17.

Specifically, the first color conversion circuit 10 carries out the first color conversion by changing the luminance component $Y_1$ of the component signal and the gains of the color components $U_1$ and $V_1$ of the component signal.

Then, the component signals $Y_2$, $U_2$, $V_2$ color-converted by the first color-conversion in the first color conversion circuit 10 are supplied to the adders 24, 25, 26 of the second color conversion circuit 20.

The key signal 4 from the key signal generating circuit 30, which will be described later on, is supplied to the multipliers 21, 22, 23. The gain register 121 supplies the color-conversion data $Y_0$ of the component signal $Y_2$ to the multiplier 21. The gain register 122 supplies the color-conversion data $U_0$ of the component signal $U_2$ to the multiplier 22. The gain register 123 supplies the color-conversion data $V_0$ of the component signal $V_2$ to the multiplier 23. Outputs which result from multiplying the key signal 4 with the color-conversion data ($Y_0$, $U_0$, $V_0$) by the multipliers 21, 22, 23 become correction signals. These correction signals are supplied to the adders 24, 25, 26, in which they are added to the component signals $Y_2$, $U_2$, $V_2$.

That is, the second color conversion circuit 20 generates the correction signals by multiplying the key signal 4 with $Y_0$, $U_0$, $V_0$. Then, the second color conversion is carried out by adding the correction signals to the component signals $Y_2$, $U_2$, $V_2$, whereby the component signals $Y_2$, $U_2$, $V_2$ color-converted by the second color conversion which acts on only the area in which the key signal 4 exists can be outputted.

Further, the second color conversion is the color conversion in which the first color conversion is canceled from the color conversion corresponding to the second color-conversion parameter. Accordingly, the color conversion designated by the second color-conversion parameter can be carried out accurately without being affected by the color conversion in the first color conversion circuit 10. That is, the color conversion from the inputted image data $Y_1, U_1, V_1$ to the outputted image data $Y_3, U_3, V_3$ agrees with the color conversion designated by the second color-conversion parameter.

Figure 3:
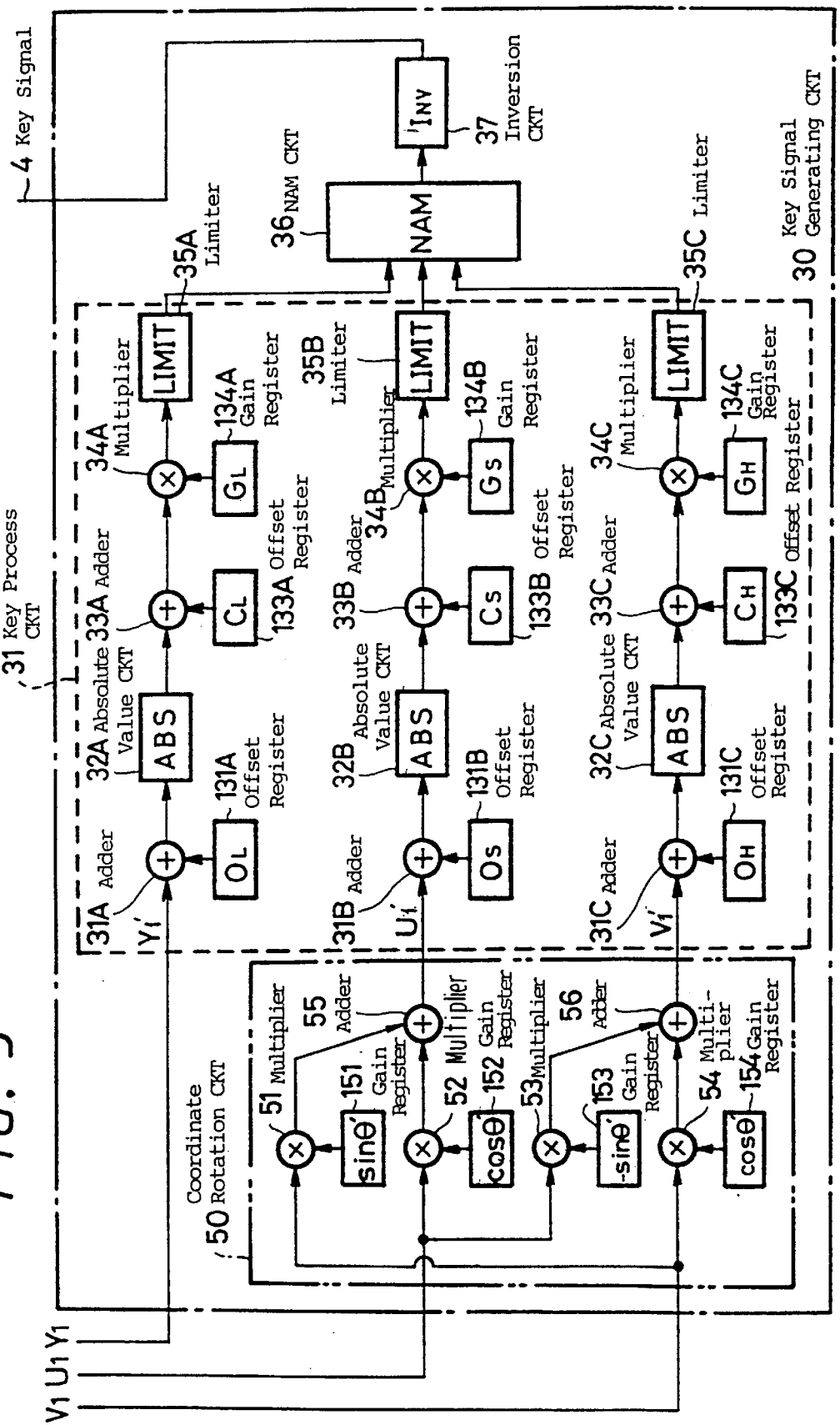
FIG. 3 is a circuit diagram showing in detail an arrangement of a key signal generating circuit 30 of the color conversion apparatus for image data according to the embodiment of the present invention.

FIG. 3 is a circuit diagram showing in detail the arrangement of the key signal generating circuit 30 in the color conversion apparatus for image data according to the embodiment of the present invention. In FIG. 3, the control circuit 40 shown in FIG. 1 is omitted. Initially, the arrangement of the key signal generating circuit 30 will be described. The key signal generating circuit 30 includes a coordinate rotation circuit 50 for rotating coordinate axes of the component signals $U_1, V_1$ in the direction of the coordinate axis of color in which the key signal is generated, a key process circuit 31 for generating width and inclination of an area of color in which the key signal is generated by assuming the color in which the key signal is generated as an origin, a NAM circuit 36 for outputting a maximum value of the outputs from the key process circuit 31 and an inversion circuit 37 for inverting an output from the NAM circuit 36.

The coordinate rotation circuit 50 includes a gain register 151 to which a gain of color-conversion data $\sin\theta'$ is supplied, a gain register 152 to which a gain of color-conversion data $\cos\theta'$ is supplied, a gain register 153 to which a gain of color-conversion data $-\sin\theta'$ is supplied and a gain register 154 to which a gain of color-conversion data $\cos\theta'$ is supplied.

The coordinate rotation circuit 50 includes a multiplier 51 for multiplying image data of the component signal $V_1$ and the gain of the gain register 151, a multiplier 52 for multiplying image data of the component signal $U_1$ and the gain of the gain register 152, a multiplier 53 for multiplying image data of the component signal $U_1$ and the gain of the gain register 153, a multiplier 54 for multiplying image data of the component signal $V_1$ and the gain of the gain register 154, an adder 55 for adding an output from the multiplier 51 and an output from the multiplier 52 and an adder 56 for adding an output from the multiplier 53 and an output from the multiplier 54. The gains supplied to the gain register 151, the gain register 152, the gain register 153 and the gain register 154 are designated by a key control signal 7 that is generated based on the color-designating parameter entered by the operator console 52.

The key process circuit 31 includes similar circuits with respect to respective systems of the component signals $Y_1, U_1, V_1$. The key process circuit 31 includes an offset register 131A having an offset value $O_L$ for causing the origin of the coordinate axis and the point of the designated color to become coincident with respect to the component signal $Y'$, an offset register 131B having an offset value $O_S$ for causing the origin of the coordinate axis and the point of color designated to become coincident with respect to the component signal $U_1'$, an offset register 131C having an offset value $O_H$ for causing the origin of the coordinate axis and the point of designated color to become coincident with respect to the component signal $Y_1'$, an adder 31A for adding the component signal $Y_1'$ and the offset value $O_L$ of the offset register 131A, an adder 31B for adding the component signal $U_1'$ and the offset value $O_S$ of the offset register 131B and an adder 31C for adding the component signal $V_1'$ and the offset value $O_H$ of the offset register 131C.

Also, the key process circuit 31 includes an absolute value circuit 32A for converting the offset component signal $Y_1'$ such that all outputs become positive, an absolute value circuit 32B for converting the offset component signal $U_1'$ such that all outputs become positive and an absolute value circuit 32C for converting the offset component signal $V_1'$ such that all outputs become positive.

The key process circuit 31 includes an offset register 133A having an offset value $C_L$ for designating a width of origin of color designated with respect to the component signal $Y_1'$ converted into the absolute value, an offset register 133B having an offset value $C_S$ for designating a width of origin of color designated with respect to the component signal $U_1'$ thus converted into the absolute value, an offset register 133C having an offset value $C_H$ for designating a width of origin of color designated with respect to the component signal $V_1'$ thus converted into the absolute value, an adder 33A for adding the component signal $Y_1'$ thus converted into the absolute value and the offset value $C_L$ of the offset register 133A, an adder 33B for adding the component signal $U_1'$ thus converted into the absolute value and the offset value $C_S$ of the offset transistor 133B and an adder 33C for adding the component signal $V_1'$ thus converted into the absolute value and the offset value $C_H$ of the offset register 133C.

The key process circuit 31 includes a gain register 134A having a gain $G_L$ for inclining an area of color designated with respect to the offset component signal $Y_1'$, a gain register 134B having a gain $G_S$ for inclining an area of color designated with respect to the offset component signal $U_1'$, a gain register 134C having a gain $G_H$ for inclining an area of color designated with respect to the offset component signal $V_1'$, a multiplier 34A for multiplying the offset component signal $Y_1'$ and the gain $G_L$ of the gain register 134A, a multiplier 34B for multiplying the offset component signal $U_1'$ and the gain $G_S$ of the gain register 134B and a multiplier 34C for multiplying the offset component signal $V_1'$ and the gain $G_H$ of the gain register 134C.

The key process circuit 31 includes a limiter 35A for converting the component signal $Y_1'$ in which the area of the designated color is inclined into a value ranging from 0 to 1, a limiter 35B for converting the component signal $U_1'$ in which the area of the designated color is inclined into a value ranging from 0 to 1, and a limiter 35C for converting the component signal $V_1'$ in which the area of the designated color is inclined into a value ranging from 0 to 1.

An operation of the key signal generating circuit 30 will be described next. In FIG. 3, the component signal $Y_1$ serving as the image data is supplied to the adder 31A of the key signal generating circuit 30 as the component signal $Y_1'$.

The component signals $U_1, V_1$ are respectively supplied to the multipliers 52, 54 disposed within the coordinate rotation circuit 50. The gain register 152 supplies the gain of the color-conversion data $\cos\theta'$ with respect to the component signal $U_1$ to the multiplier 52. A rotational angle register 154 supplies the gain of the color-conversion data $\cos\theta'$ with respect to the component signal $V_1$ to the multiplier 54. The component signal $V_1$ is supplied to the multiplier 51. A rotational angle register 151 supplies the gain of the color-conversion data $\sin\theta'$ with respect to the component signals $V_1$ and $U_1$ to the multiplier 51. Outputs of the multipliers 51 and 52 are supplied to and added by the adder 55 and thereby outputted as the component signal $U_1'$. The component signal $U_1$ is supplied to the multiplier 53. A rotational angle register 153 supplies the gain of the color-conversion data $\sin\theta'$ with respect to the component signals $U_1$ and $V_1$ to the multiplier 53. Outputs from the multipliers 53 and 54 are supplied to and added by the adder 56 and thereby outputted as the component signal $V_1'$.

Assuming that a color-conversion matrix K as:

$$K = \begin{bmatrix} \cos\theta' & \sin\theta' \\ -\sin\theta' & \cos\theta' \end{bmatrix}$$

then coordinate conversion indicated by the coordinate conversion circuit 50 can be expressed by the following equation:

$$\begin{bmatrix} U_1' \\ V_1' \end{bmatrix} = K \begin{bmatrix} U_1 \\ V_1 \end{bmatrix} \quad (3)$$

Figure 4:
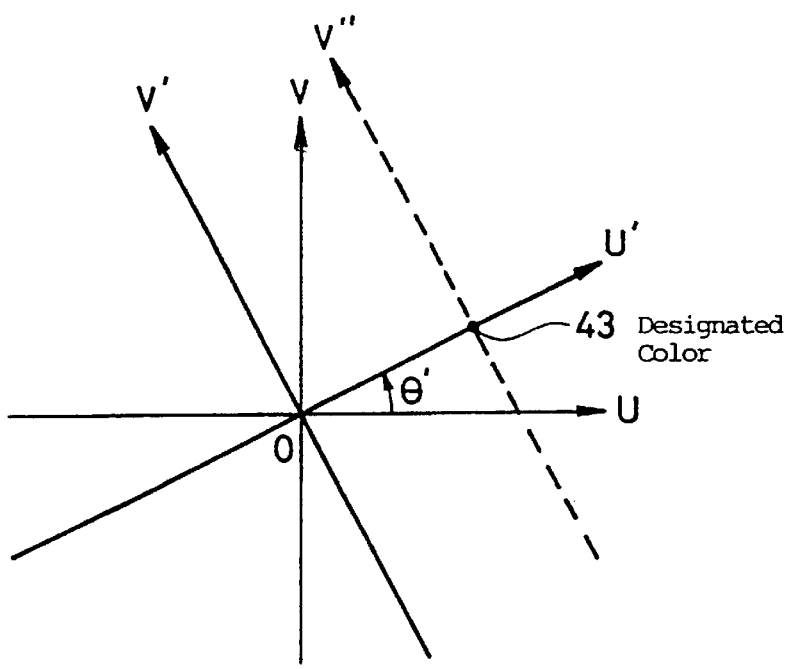
FIG. 4 is a diagram showing an operation of a coordinate rotation circuit 50 of the color conversion apparatus for image data according to the embodiment of the present invention.

This equation (3) means that both of a saturation axis and a hue axis in the three-dimensional color coordinate comprising lightness axis, saturation axis and hue axis are rotated by a rotational angle θ' degrees in parallel to the saturation-hue plane. The rotational angle θ' is computed in such a manner that a color designated by the color-designating parameter entered from the operator console 42 is positioned on a converted U' axis. Specifically, as shown in FIG. 4, U and V axes are rotated by θ' degrees in such a manner that the U axis is positioned in the direction of a color 43 designated so as to be extracted as the key signal by the operator.

Further, the operation for rotating the U and V axes such that the point 43 of the designated color is positioned on the U axis means, in other words, an operation for giving an offset to the point 43 of the designated color so as to eliminate a hue component. Therefore, in FIG. 4, hue of the designated point 43 in the Y'U'V' coordinate system is 0, and saturation of the designated point 43 in the Y'U'V' coordinate system is expressed by a distance from the origin.

Then, the offset register 131A supplies the offset value $O_L$ of the component signal $Y_1'$ to the adder 31A. The adder 31A causes the origin of the coordinate axis of the component signal $Y^{1'}$ to become coincident with the point of the designated color by the offset value $O_L$. The offset register 131B supplies the offset value $O_S$ of the component signal $U_1'$ to the adder 31B. The adder 31B causes a point of coordinate axis of the component signal $U_1'$ to become coincident with the origin of the designated color by the offset value $O_S$. The offset register 131C supplies the offset value $O_H$ of the component signal $V_1'$ to the adder 31C. The adder 31C causes the origin of the coordinate axis of the component signal $V_1'$ to become coincident with the point of designated color by the offset value $O_H$.

An output from the adder 31A is supplied to an absolute value circuit (ABS) 32A. An output from the adder 31B is supplied to an absolute value circuit (ABS) 32B. An output from the adder 31C is supplied to an absolute value circuit (ABS) 32C.

In this embodiment, since the luminance component $Y_1'$ in the Y'U'V' coordinate system is not converted by the coordinate rotation circuit 50, if the offset value $O_L$ is added to the luminance component, then the luminance component $Y_1'$ can be canceled to 0. Specifically, the offset operation is carried out in such a manner that the origin of the Y coordinate (direction from the rear to the surface of the sheet of drawing) shown in FIG. 4 is contained in the U-V plane including the designated color 43.

A color component $U_1'$ in the Y'U'V' coordinate system can be expressed by a distance from the origin of the Y'U'V' coordinates to the point 43 as shown in FIG. 4. A color component $V_1'$ in the Y'U'V' coordinate system is 0 because the point 43 exists on the U' axis as shown in FIG. 4. Accordingly, this color component $U_1'$ indicates a saturation, and the color component $V_1'$ indicates a hue.

Therefore, the color component $U_1'$ can be canceled to 0 by adding the offset value $O_S$ to the color component $U_1'$. Specifically, as shown in FIG. 4, the offset operation is carried out such that the designated point 43 exists on a V" axis which is converted from the V' axis. Further, since the color component $V_1'$ is already 0 without the addition of offset, the offset value $O_H$ in this embodiment is 0.

However, since the coordinate rotation circuit 50 can be omitted, if the coordinate rotation circuit 50 is omitted, then there is provided a three-dimensional space of component signals $Y_1$, $U_1$, $V_1$. Therefore, the adder 31C and the offset register 131C are used in order to designate the operation that the point 43 which designates the V" axis with respect to the component signal $V_1$ is moved so as to be contained in the origin.

Figure 5:
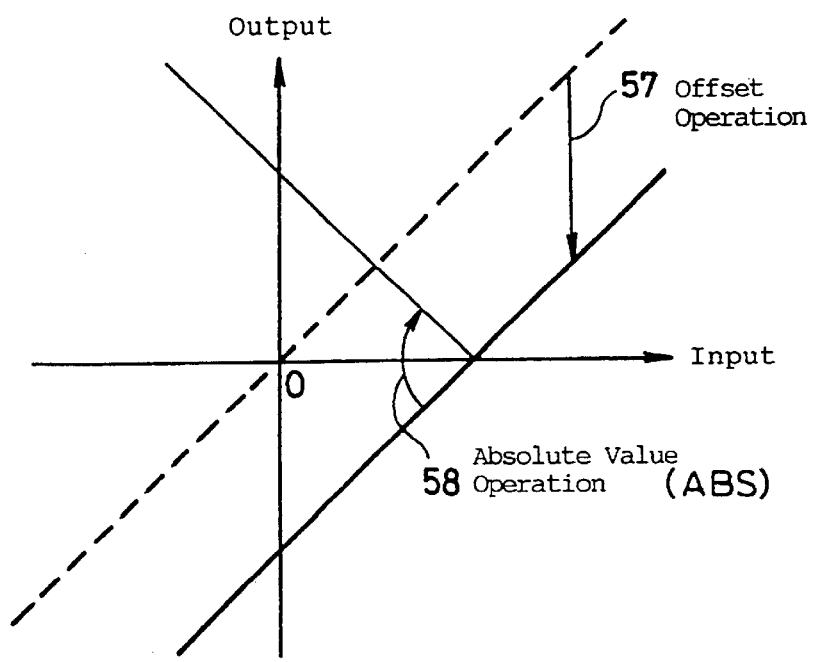
FIG. 5 is a diagram showing an offset operation and an absolute value operation of key process of the color conversion apparatus for image data according to the embodiment of the present invention.

FIG. 5 is a diagram showing an offset operation and an absolute value operation of the color conversion apparatus for image data according to the embodiment of the present invention. In FIG. 5, after the offsets were added to the component signals $Y_1'$, $U_1'$, $V_1'$ such that the output becomes 0 relative to the input, absolute values are calculated, and a negative portion is folded. Specifically, an offset operation is started from a dashed line portion and the dashed line portion is converted into a solid line portion. Further, an absolute value operation (ABS) 58 is carried out and the negative portion is folded such that all outputs become positive.

An operation for designating a width for a point of designated color with respect to the component signals $Y_1$, $U_1'$, $V_1'$ and an inclination relative to the area of color will be described. The width for color is a width used to determine the number of colors around the point of the designated color as a key signal. The inclination for the area of color is an inclination used to determine a border between the key area indicated by the digital signal 1 and other areas indicated by the digital signal 0. Outputs of the absolute value circuits (ABS) 32A, 32B, 32C are respectively supplied to the adders 33A, 33B, 33C. The offset register 133A supplies the offset value $C_L$ of the component signal $Y_1'$ to the adder 33A. The adder 33A designates the width relative to the point of the color designated with respect to the component signal $Y_1'$ with the absolute value converted by use of the offset value $C_L$. The offset register 133B supplies the offset value $C_S$ of the component signal $U_1'$ to the adder 33B. The adder 33B designates the width relative to the point of the color designated with respect to the component signal $U_1'$ with the absolute value converted by use of the offset value $C_S$. The offset register 133C supplies the offset value $C_H$ Of the component signal $V_1'$ to the adder 33C. The adder 33C designates the width relative to the point of the color designated with respect to the component signal $V_1'$ with the absolute value converted by use of the offset value $C_H$.

Outputs from the adders 33A, 33B, 33C are respectively supplied to the multipliers 34A, 34B, 34C. The gain register 134A supplies the gain $G_L$ of the component signal $Y_1'$ to the multiplier 34A. The multiplier 34A inclines the offset component signal $Y_1'$ by the gain $G_L$. The gain register 134B supplies the gain $G_S$ of the component signal $U_1'$ to the multiplier 34B. The multiplier 34B inclines the offset component signal $U_1'$ by the gain $G_S$. The gain register 134C supplies the gain $G_H$ of the component signal $V_1'$ to the multiplier 34C. The multiplier 34C inclines the offset component signal $V_1'$ by use of the gain $G_H$.

Figure 6:
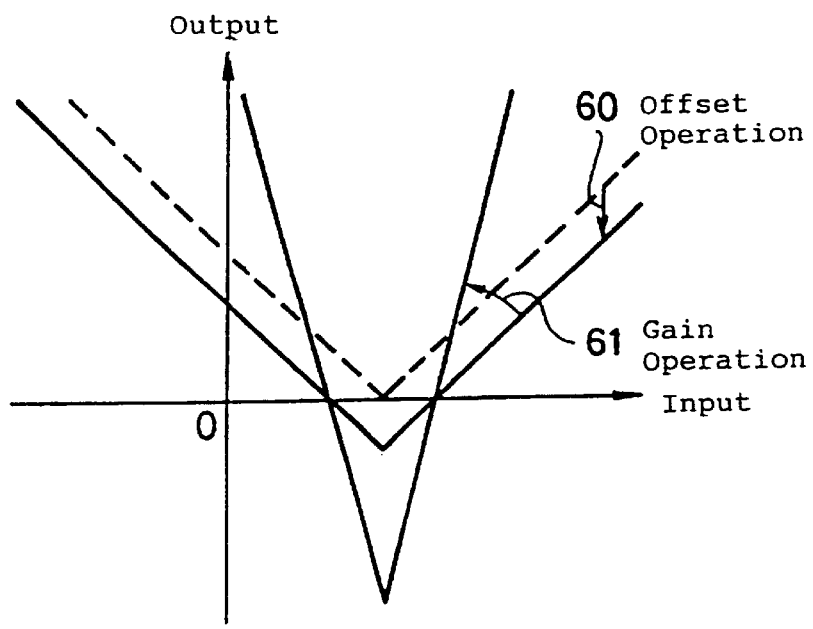
FIG. 6 is a diagram showing an offset operation and a gain operation of the key process of the color conversion apparatus for image data according to the embodiment of the present invention.

FIG. 6 is a diagram showing an operation for designating width and inclination of the origin of the color designated by the key signal in the color conversion apparatus for image data according to the present invention. FIG. 6 shows an offset operation and a gain operation of the aforesaid key process. In FIG. 6, a dashed-line portion is converted into a solid-line portion by an offset operation 60 to thereby designate a width crossing the input axis. Further, by a gain operation 61, the width is extended in the output axis direction and thereby inclined.

Figure 7:
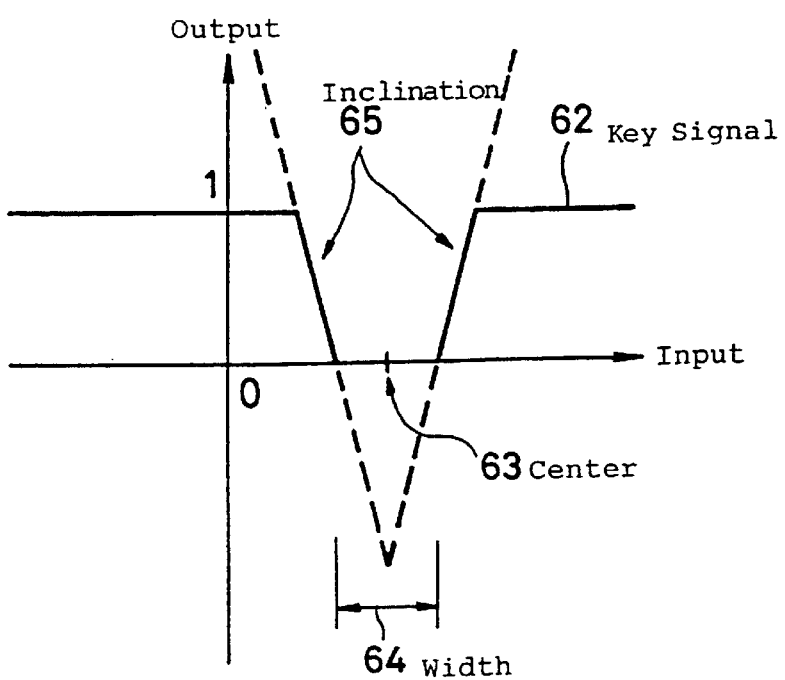
FIG. 7 is a diagram showing a limit operation of the key process of the color conversion apparatus for image data according to the embodiment of the present invention.

Then, the outputs of the multipliers 34A, 34B, 34C are respectively supplied to the limiters 35A, 35B, 35C. FIG. 7 is a diagram showing a limit operation of the key process. In FIG. 7, the dashed-line portion which is provided by the gain operation shown in FIG. 6 is converted into a key signal having a value ranging from 0 to 1 as shown by a solid-line portion. The key signal has a center 63 obtained by the absolute value operation shown in FIG. 5 and a width 64 and an inclination 65 obtained by the offset operation and the gain operation shown in FIG. 6.

As described above, the component signals $Y_1'$, $U_1'$, $V_1'$ are respectively converted into key signals 62 shown in FIG. 7 by the adders 31A, 31B, 31C, the absolute value circuits 32A, 32B, 32C, the adders 33A, 33B, 33C, the multipliers 34A, 34B, 34C and the limiters 35A, 35B, 35C composing the key process circuit. Then, outputs from the limiters 35A, 35B, 35C are supplied to the NAM circuit 36. The NAM circuit 36 synthesizes the key signals 62 from the limiters 35A, 35B, 35C. The NAM circuit 36 is the circuit for outputting the maximum value of the key signals from the limiters 35A, 35B, 35C.

Figure 8:
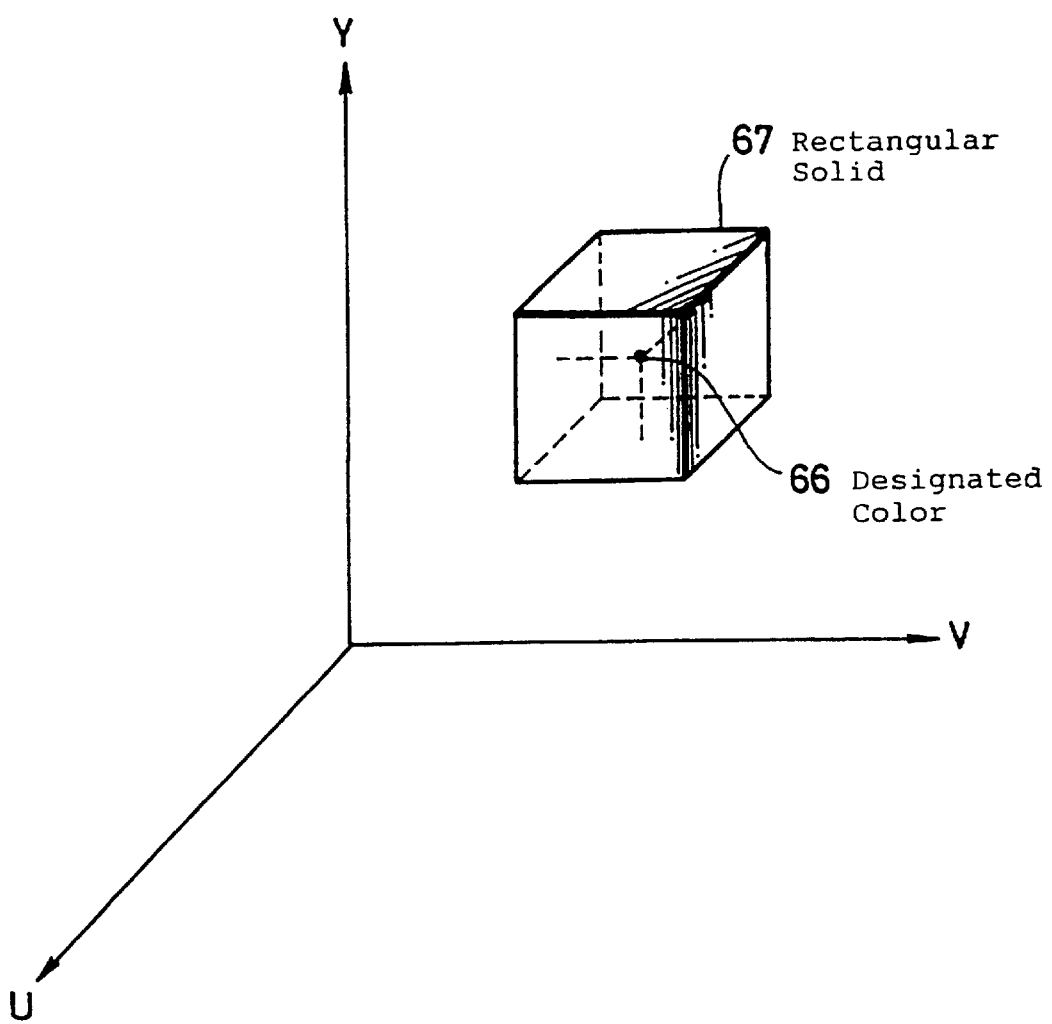
FIG. 8 is a diagram showing a key signal in a color space in the color conversion apparatus for image data according to the embodiment of the present invention.

Accordingly, the key signal synthesized by the NAM circuit 36 can be expressed as L, S, H in the color space or as a rectangular solid 67 having a designated color 66 at its center in the three-dimensional space of the component signals Y, U, V as shown in FIG. 8. That is, a length of one side of this rectangular solid 67 is equal to the width relative to the designated color. Further, the area indicated by the output from the NAM circuit 36 is the area indicated by the external portion of the rectangular solid 67.

The key signal synthesized by the NAM circuit 36 is supplied to an inversion circuit 37. The inversion circuit 37 is a circuit for replacing 0 and 1 of the key signal. Assuming that k is an input and k' is an output, then k'=1−k is established. The key signal 4 outputted from the inversion circuit 37 is supplied to the second color conversion circuit 20 shown in FIG. 2. Thus, the key signal having a value ranging from 0 to 1 in the area of color which should be color-converted can be generated and supplied to the second color conversion circuit 20.

As described above, since the key signal 4 is composed of the component signals $Y_1$, $U_1$, $V_1$, which are not color-converted, supplied to the first color conversion circuit 10, the key signal 4 can be protected from being affected by the first color conversion circuit 10. Accordingly, even when the first color conversion circuit 10 performs any color-conversion, an area of color colored-converted by the second color conversion 20 can be prevented from being changed. With the above-mentioned arrangement, different picture effects can be obtained by changing a control of color conversion.

Figure 9:
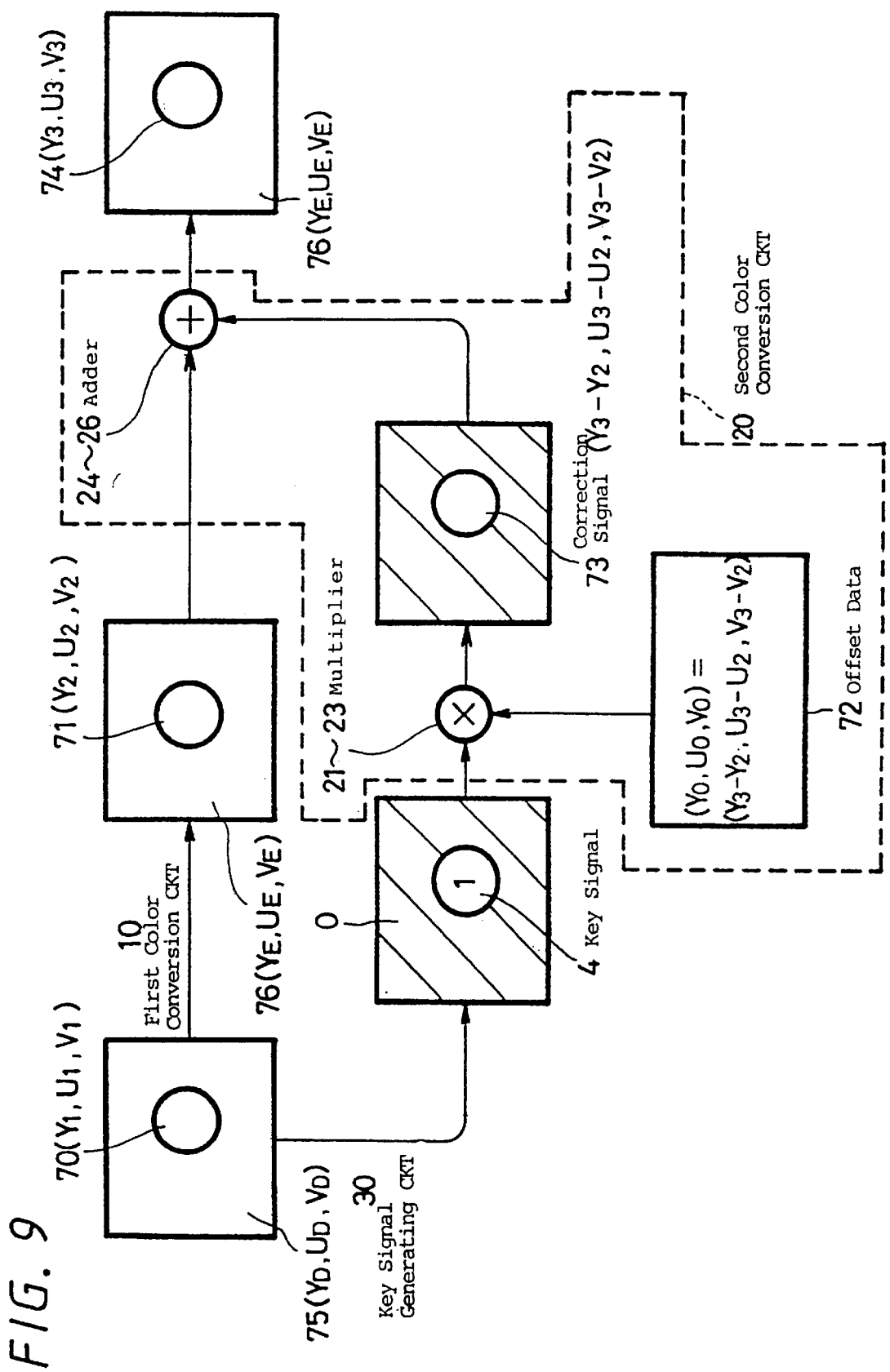
FIG. 9 is a diagram showing an example of control in the color conversion apparatus for image data according to the embodiment of the present invention.

FIG. 9 is a diagram showing an example of control in the color conversion apparatus for image data according to the embodiment of the present invention. In this embodiment, in particular, the second color conversion circuit 20 computes color-conversion data $Y_0$, $U_0$, $V_0$ multiplied with the key signal 4 in such a manner that the color-conversion done in the first color conversion circuit 10 is canceled out. Therefore, only the color of the area indicated by the key signal can be prevented from being affected by the first color conversion circuit 10 at the preceding stage.

In FIG. 9, assuming that a circle area of color for generating a key signal is represented by an area ($Y_1$, $U_1$, $V_1$) 70 and other area is represented by an area ($Y_D$, $U_D$, $V_D$) 75, then the circle area is converted into an area ($Y_Z$, $U_Z$, $V_Z$) 71 and other area is converted into an area ($Y_E$, $U_E$, $V_E$) 76 by the first color conversion circuit 10. The circle area 71 and the other area 76 are color-converted by the first color conversion circuit 10 in the first color-conversion manner. The key signal generating circuit 30 generates a key signal 4, which is indicated by 1 of the circle area other than the hatched area 0, from the area ($Y_1$, $U_1$, $V_1$) 70. This key signal 4 is supplied to the multipliers 21 to 23 of the second color conversion circuit 20 shown by a dashed block. If ($Y_0$, $U_0$, $V_0$)=($Y_3$−$Y_2$, $U_3$−$U_2$, $V_3$−$V_2$) 72 is given as the color-conversion data, then this color-conversion data is multiplied with the area shown by the key signal 4 by the multipliers 21, 22, 23.

Thus, there is generated a planar correction signal ($Y_3$−$Y_2$, $U_3$−$U_2$, $V_3$−$V_2$) 73 having a designated color in the circle area designated by the key signal. Since the area of the correction signal ($Y_3$−$Y_2$, $U_3$−$U_2$, $V_3$−$V_2$) 73 is designated by the key signal, such correction signal is added to the circle area ($Y_2$, $U_2$, $V_2$) by the adders 24, 25, 26. Accordingly, the circle area which is originally the ($Y_1$, $U_1$, $V_1$) 70 is corrected into a circle area ($Y_3$, $U_3$, $V_3$) 74 by the correction signal. Accordingly, this circle area can be prevented from being affected by the first color conversion circuit 10.

A value of offset data ($Y_0$, $U_0$, $V_0$) will be calculated hereinafter. Assuming that a color-conversion matrix A used by the first color conversion circuit 10 to convert the ($Y_1$, $U_1$, $V_1$) into the ($Y_2$, $U_2$, $V_2$) is represented as:

$$A = \begin{bmatrix} \cos\theta & \sin\theta \\ -\sin\theta & \cos\theta \end{bmatrix}$$

then the color conversion indicated by the first color conversion 10 can be expressed as:

$$Y_2 = \alpha Y_1 \quad (4)$$

$$\begin{bmatrix} U_2 \\ V_2 \end{bmatrix} = \beta A \begin{bmatrix} U_1 \\ V_1 \end{bmatrix} = \begin{bmatrix} \beta\cos\theta & \beta\sin\theta \\ -\beta\sin\theta & \beta\cos\theta \end{bmatrix} \begin{bmatrix} U_1 \\ V_1 \end{bmatrix} \quad (5)$$

Values of the gain coefficient α, the gain coefficient β and the color-conversion matrix A are determined based on the first color-conversion parameter entered by the operator console 43.

Then, assuming that a color-conversion matrix B used by the first color conversion circuit 10 and the second color conversion circuit 20 to convert the ($Y_1$, $U_1$, $V_1$) to the ($Y_3$, $U_3$, $V_3$) 74 as:

$$B = \begin{bmatrix} \cos\phi & \sin\phi \\ -\sin\phi & \cos\phi \end{bmatrix}$$

then the second color conversion carried out by the second color conversion circuit 20 is expressed by the following equations:

$$Y_3 = \alpha' Y_1 \quad (6)$$

$$\begin{bmatrix} U_3 \\ V_2 \end{bmatrix} = \beta' \quad (7)$$

$$B \begin{bmatrix} U_1 \\ V_1 \end{bmatrix} = \begin{bmatrix} \beta'\cos\phi & \beta'\sin\phi \\ -\beta'\sin\phi & \beta'\cos\phi \end{bmatrix} \begin{bmatrix} U_1 \\ V_1 \end{bmatrix}$$

Values of the gain coefficient α', the gain coefficient β' and the color-conversion matrix B are determined based on the second color-conversion parameter entered by the operator console 43. When the first color conversion is carried out, the values of the gain coefficient α', the gain coefficient β' and the color-conversion matrix B and the inputted image data $Y_1$, $U_1$, VI are stored in the memory 41.

Then, the control circuit 40 computes the color conversion data $Y_0$ based on the gain coefficient a entered by the operator console and the inputted image data $Y_1$. Based on the equations (4) and (6), the value of the color conversion data $Y_0$ is expressed as:

$$Y_0 = Y_3 - Y_2$$
$$= \alpha' Y_1 - \alpha Y_1$$
$$= (\alpha' - \alpha) Y_1$$

Accordingly, the control circuit 40 supplies the thus computed color conversion data $Y_0$ to the gain register 121.

Similarly, the control circuit 40 computes the color conversion data $U_0$ based on the values of the gain coefficient α, the gain coefficient β and the color-conversion matrix A entered by the operator console, the values of the gain coefficient α, the gain coefficient β and the color-conversion matrix A stored in the memory 41 and the inputted image data $U_1$, $V_1$. Based on the equations (5) and (7), the color conversion data $U_0$ is expressed as:

$$U_0 = U_3 - U_2$$
$$= U_1 \beta' \cos\phi + V_1 \beta' \sin\phi - U_1 \beta \cos\theta - V_1 \beta \sin\theta$$
$$= U_1 (\beta' \cos\phi - \beta \cos\theta) + V_1 (\beta' \sin\phi - \beta \sin\theta)$$

Accordingly, the control circuit 40 supplies the thus computed color conversion data $U_0$ to the gain register 122.

Similarly, the control circuit 40 computes the color conversion data $V_0$ based on the values of the gain coefficient α, the gain coefficient β and the color-conversion matrix A entered by the operator console, the values of the gain coefficient α, the gain coefficient β and the color-conversion matrix A stored in the memory 41 and the inputted image data $U_1$, $V_1$. Based on the equations (5) and (6), the value of the color conversion data $V_0$ is expressed as:

$$V_0 = V_3 - V_2$$
$$= -U_1 \beta' \sin\phi + V_1 \beta' \cos\phi + U_1 \beta \sin\theta - V_1 \beta \cos\theta$$
$$= U_1 (-\beta' \sin\phi + \beta \sin\theta) + V_1 (\beta' \cos\phi - \beta \cos\theta)$$

Accordingly, the control circuit 40 supplies the thus computed color conversion data $V_0$ to the gain register 122.

Further, in the above embodiment, if the color conversion data $Y_0$, $U_0$, $V_0$ which are multiplied to the key signal 4 in the succeeding second color conversion circuit 20 in FIG. 2 are controlled so as to have values incorporating the first color conversion executed by the preceding first color conversion circuit 10, then the preceding first color conversion circuit 10 and the succeeding second color conversion circuit 20 may be operated with their physical positions being replaced. Specifically, the color conversion can be carried out as if the whole of the image were color-converted after a specific color has been converted.

It is needless to say that the gain registers 111, 112, 113, 114, 115, 121, 122, 123 shown in FIG. 2, the gain registers 151, 152, 153, 154, the offset registers 131A, 131B, 131C, 133A, 133B, 133C, the gain registers 134A, 134B, 134C shown in FIG. 3 are controlled by the control circuit 40 shown in FIG. 1.

According to the above embodiment, in FIG. 2, the first color conversion in the first color conversion circuit 10 is a linear conversion and may be a nonlinear conversion such as a gamma correction.

According to the above embodiment, in FIGS. 2 and 3, while the component signals $Y_1$, $U_1$, $V_1$ are used as the image data as described above, a similar arrangement and a similar action can be achieved by use of RGB signals and composite signal.

According to the above embodiment, in FIG. 1, since the first color conversion circuit 10 serving as the first color converting means effects the first color conversion on the inputted image data, the second color conversion circuit 20 serving as the second color converting means effects the second color conversion by adding the correction signal, which is corrected so as to cancel the first color conversion done by the first color converting means, to the specific area of the image data outputted from the first color converting means and the key signal generating circuit 30 serving as the key signal generating means generates the key signal 4 from the image data supplied to the first color conversion circuit 10 serving as the first color converting means, the output result of the second color conversion circuit 20 serving as the color converting means of specific, color at the succeeding stage can be prevented from being affected by the output result of the first color conversion circuit 10 serving as the color converting means of the whole of the image at the succeeding stage.

According to the above embodiment, in FIG. 5, since the correction signal which is corrected so as to cancel the first color conversion done by the first color conversion circuit 10 serving as the first color converting means is used by the second color conversion circuit 20 serving as the second color converting means, the output result can be prevented from being affected by the color conversion of image data done by the first color conversion circuit 10 serving as the first color converting means. Therefore, the whole of the image can be color-converted and the specific color can be color-converted simultaneously, and in addition, these two color conversions can be prevented from affecting each other.

According to the above embodiment, in FIG. 3, since the key signal generating circuit 30 serving as the key signal generating means includes the coordinate rotation circuit 50 serving as the color coordinate rotating means for designating the coordinate direction of color for generating the key signal 4, as shown in FIG. 4, the coordinate axis expressing the color space can be rotated in accordance with the color direction in which the key signal 4 is generated.

According to the above embodiment, as shown in FIG. 9, the present invention is the color conversion method of image data for color-correcting or color-converting image data. The first color conversion is effected on the inputted image to generate the key signal from the inputted image data. The second color conversion is effected on the specific area of the image data color-converted by the first color conversion by adding the correction signal corrected so as to cancel the first color conversion. The key signal is generated from the inputted image data and the second color conversion is effected on only the area 74 of the specific area by adding the correction signal 73 with the key signal 4 indicative of the area of the specific area to the image data color-converted by the first color conversion. Therefore, the output result of the succeeding second color conversion of the specific color can be prevented from being affected by the output result of the preceding first color conversion which color-converts the whole of the image.

Further, according to the above embodiment, as shown in FIG. 9, since the correction signal 73 results from multiplying the image data indicative of the color area in which the image data color-converted by the first color conversion is subtracted from the image data of specific color with the key signal 4, the correction signal 73 can easily be generated by generating the image data indicative of the color area in which the image data color-converted by the first color-conversion is subtracted from the image data of specific color.

Further, according to the above embodiment, since the first color-conversion parameter for effecting the first color conversion on the whole image of the image data and the second color-conversion parameter for effecting the second color conversion of the specific color are entered by the operator console 42 serving as the input means, the image data for generating the correction signal can be easily generated by entering the first color conversion parameter and the second color conversion parameter.

Furthermore, according to the above embodiment, as shown in FIG. 1, since the first color-conversion parameter, the second color-conversion parameter and the color-designating parameter are respectively inputted and controlled, by designating the desired color, the output result of the succeeding color conversion of the specific color can be prevented from being affected by the output result of the preceding color conversion which color-converts the whole image.

According to the present invention, the following effects are achieved.

According to the color conversion apparatus for image data of the present invention, since the first color converting means effects the first color conversion on the inputted image data, the second color converting means effects the second color conversion by adding the correction signal, which is corrected so as to cancel the first color conversion done by the first color converting means, to the specific area of the image data outputted from the first color converting means and the key signal generating means generates the key signal from the image data supplied to the first color converting means, the output result of the color converting means of specific color at the succeeding stage can be prevented from being affected by the output result of the color converting means of the whole of the image at the succeeding stage.

According to the color conversion apparatus for image data of the present invention, since the correction signal which is corrected so as to cancel the first color conversion done by the first color converting means is used by the second color converting means, the output result can be prevented from being affected by the color conversion of image data done by the first color converting means. Therefore, the whole of the image can be color-converted and the specific color can be color-converted simultaneously, and in addition, these two color conversions can be prevented from affecting each other.

According to the color conversion apparatus for image data of the present invention, since the key signal generating means includes the color coordinate rotating means for designating the coordinate direction of color for generating the key signal, the coordinate axis expressing the color space can be rotated in accordance with the color direction in which the key signal is generated.

According to the color conversion apparatus for image data of the present invention, the present invention is the color conversion method of image data for color-correcting or color-converting image data. The first color conversion is effected on the inputted image to generate the key signal from the inputted image data. The second color conversion is effected on the specific area of the image data color-converted by the first color conversion by adding the correction signal corrected so as to cancel the first color conversion. The key signal is generated from the inputted image data and the second color conversion is effected on only the area of the specific area by adding the correction signal with the key signal indicative of the area of the specific area to the image data color-converted by the first color conversion. Therefore, the output result of the succeeding second color conversion of the specific color can be prevented from being affected by the output result of the preceding first color conversion which color-converts the whole of the image.

Further, according to the color conversion method for image data of the present invention, since the correction signal results from multiplying the image data indicative of the color area in which the image data color-converted by the first color conversion is subtracted from the image data of specific color with the key signal, the correction signal can easily be generated by generating the image data indicative of the color area in which the image data color-converted by the first color-conversion is subtracted from the image data of specific color.

Further, according to the color conversion method of the present invention, since the first color-conversion parameter for effecting the first color conversion on the whole image of the image data and the second color-conversion parameter for effecting the second color conversion of the specific color are entered by the input means, the image data for generating the correction signal can be easily generated by entering the first color conversion parameter and the second color conversion parameter.

Furthermore, according to the color conversion apparatus of the present invention, since the first color-conversion parameter, the second color-conversion parameter and the color-designating parameter are respectively inputted and controlled, by designating the desired color, the output result of the succeeding color conversion of the specific color can be prevented from being affected by the output result of the preceding color conversion which color-converts the whole image.

INDUSTRIAL APPLICABILITY

As described above, according to the color conversion apparatus for image data and the color conversion method for image data of the present invention, the present invention is suitably applied to a color corrector for color-converting image data.

What is claimed is:

1. A color conversion method for color-correcting or color- converting image data comprising the steps of:

inputting a first color conversion parameter and a second color conversion parameter;

receiving inputted image data representative of an image at a first color converting means and effecting a first color-conversion on the image data of the entire image by use of said first color-converting means;

generating a key signal from the image data supplied to said first color-converting means;

receiving the color-converted image data representative of the entire image from said first color-converting means and canceling said first color-conversion in an area of the image designated in accordance with said key signal and effecting a second color-conversion by use of a second color-converting means on the image data of said area; and supplying a first control signal to said first color-converting means such that said first color-converting means performs in accordance with said first color-conversion parameter and supplying a second control signal to said second color-converting means such that said second color-converting means performs in accordance with said second color-conversion parameter.

* * * * *